United States Patent [19]
Schepka

[11] Patent Number: 5,793,294
[45] Date of Patent: Aug. 11, 1998

[54] SUMP ALARM

[76] Inventor: Louis F. Schepka, 1739 Brandon Ave., Youngstown, Ohio 44514

[21] Appl. No.: 529,362

[22] Filed: Sep. 18, 1995

[51] Int. Cl.[6] .................................................. G08B 21/00
[52] U.S. Cl. ........................ 340/616; 340/450; 340/604; 340/618; 340/620; 73/290 R; 73/304 R
[58] Field of Search .................................. 340/616, 612, 340/618, 620, 604, 450; 73/304 R, 290 R

[56]  References Cited

U.S. PATENT DOCUMENTS

| | | | |
|---|---|---|---|
| 4,110,740 | 8/1978 | Akita et al. | 340/620 |
| 4,188,826 | 2/1980 | Kankura et al. | 73/304 R |
| 4,227,190 | 10/1980 | Kelley et al. | 340/604 |
| 4,264,902 | 4/1981 | Miller | 340/604 |
| 4,279,078 | 7/1981 | Hinshaw et al. | 33/716 |
| 4,377,550 | 3/1983 | Tokarz | 376/245 |
| 4,804,947 | 2/1989 | Geleziunas | 340/620 |
| 4,827,242 | 5/1989 | Blankenship et al. | 340/450 |
| 4,827,246 | 5/1989 | Dolan et al. | 340/521 |
| 4,841,282 | 6/1989 | Reis | 340/521 |
| 5,048,334 | 9/1991 | Hampton et al. | 340/620 |
| 5,345,224 | 9/1994 | Brown | 340/605 |
| 5,483,227 | 1/1996 | Kuo et al. | 340/618 |

*Primary Examiner*—Jeffery A. Hofsass
*Assistant Examiner*—Davetta Woods
*Attorney, Agent, or Firm*—Joseph H. Taddeo

[57] ABSTRACT

A galvanic cell is formed when ground water within a sump reservoir, tub or other pool, rises to contact electrodes constructed of dissimilar metals, the electrodes mounted in a bridge, with recessing, expansion brackets, to facilitate covering the sump hole and including an alarm device adapted to provide a warning signal should the water level exceed a predetermined level to contact the electrodes.

30 Claims, 2 Drawing Sheets

SUMP ALARM

FIELD OF INVENTION

The present invention relates to liquid level detection and alarm systems having a pair of electrodes and more particularly, to a probe having immersible electrodes of dissimilar metals to sense the level of liquids, such as water, by producing a voltage. This novel liquid level detection system protects against water damage by alarming when the level becomes appreciably high. The present invention finds application in sump pump water level alarms, Jacuzzi water overflow alarms and bilge water alarm systems. Other areas of application may include hot tubs, spas, saunas, whirlpools and swimming or wading pools.

A newly designed bracket provides for the universal mounting of the sensor probes in the sump reservoir. It is adjustable from a 9 inch to an infinite radius.

BACKGROUND OF THE INVENTION

There has been a need for an improved method of sensing the level of liquids, such as water, to sound an audible alarm in the presence of high water to prevent water damage. High water detection and alarm systems have been in use for some time.

One of the more common systems consists of a buoyant float that activates a switch closure to complete an electrical circuit, sounding an alarming device. These systems can be subject to various failures as the system ages and these failures may defeat the purpose of the alarm system; floats may develop pin holes and fill with water. Other possible modes of failure may include buoyant materials that eventually become saturated with the liquid and lose their buoyancy; pivots and other members that are subject to corrosion may stick, preventing reliable operation; switch contacts may oxidize, causing the alarm system to fail and not issue its warning.

Another type of level sensing system determines the fluid level by measuring the conductivity of water when its metallic electrodes are immersed in the water. In this type of system the electrodes are made of similar metals.

In 1883 Michael Faraday observed that pure water was an almost perfect insulator; whereas aqueous solutions of certain substances were electrically conductive. If two electrodes are dipped into a container of distilled water, and one electrode is connected to the positive terminal of a DC source, the other to the negative, practically no current flows. When a small amount acid, base or salt is added to the water, it provides, when dissolved in water, a solution whose resistance is sufficiently low for the current to be appreciable. A solution that conducts an electric current is called an electrolyte and this conduction phenomenon is more commonly known as electrolysis. The resistance of the solution depends markedly on the concentration and upon the temperature.

This system has the disadvantage of becoming unreliable when the probes oxidize over a period of time. If the process of oxidation occurs, the total measured resistance will increase dramatically.

Other liquid level sensing systems sense the change in capacitance within a vessel to determine the level of the fluid. These systems are rather insensitive because small changes in the height of the fluid are not easily or reliably determined from the very small changes in capacitance.

Another system of sensing the fluid level is by determining the change of resistance when a self heated thermistor is immersed into the liquid. A self heated thermistor has the disadvantage of being unreliable when cooled too much and tripping the alarm if the ambient temperature suddenly drops. Wind passing by an unprotected thermistor can also give a false nuisance alarm. Generally, this system is more costly to produce.

There are several patents that disclose water level sensing and alarm systems.

U.S. Pat. No. 4,369,438, granted Jan. 18, 1983, to J. R. Wilhelmi discloses a sump pump detection and alarm system that generates an alarm in the event (1) high water is detected with power available, (2) high water is detected in the absence of power, or (3) when there is a power failure to the pump at any time.

U.S. Pat. No. 4,456,432, granted Mar. 1, 1984, to V. Mannino, discloses an emergency sump pump and alarm warning system comprised of an auxiliary battery powered sump pump that emits an intermittent audible and visual alarm when the battery powered sump pump is activated.

U.S. Pat. No. 5,314,313, granted May 24, 1994, to L. Janesky discloses an alarm system that sounds an audible alarm whenever the water level within a sump pump enclosure exceeds the operating level of the sump pump.

Therefore, it can be concluded that there exists a continuing need for the development of reliable and safe detection devices that can detect the presence of high water. In this regard, this invention fulfills this need.

SUMMARY OF THE INVENTION

The present invention in its preferred embodiment relates to an improved high water detection system that is designed for use with sump pumps. Whenever the water level in a sump increases beyond a predetermined level an alarm is sounded.

The system is comprised of a novel liquid level sensor mounted to a newly designed universally adjustable bracket. A pair of insulated conductors connects the liquid level sensor to a remotely located wall mounted audible alarm. The battery operated alarm remains operational even when there is a prolonged loss of power.

The present liquid level sensor detects a voltage that is generated when its electrodes come in contact with the rising water within a sump.

The probe is comprised of two electrodes, each of which is made of dissimilar metals. The combination of two dissimilar metals immersed in an electrolyte constitutes a voltaic or a galvanic cell, named after Volta and Galvani, who first studied them. The principle of which the galvanic cell operates may be considered to be the opposite of an electrolytic cell.

In the preferred embodiment, the two electrodes used are aluminum and brass respectively. However, it should be understood that there are numerous other combinations of dissimilar metals that can be used, and should not detract from the spirit of this invention.

As a first step of understanding the principles of operation of the galvanic cell, consider what happens when the aluminum electrode is dipped into the water. Aluminum ions immediately go into solution. The chemical equation for this process may be written as follows:

$$Al \rightarrow Al^{+++} + 3e^-$$

The presence of more aluminum ions in solution increases the reverse reaction rate; and the electrode potential decreases to a lower equilibrium value. It is evident that the equilibrium potential of the aluminum with respect to the solution depends upon the concentration of aluminum ions that surrounds the aluminum electrode.

Conversely, copper and tin ions go into solution surrounding the brass electrode. The chemical equations for this process are:

$$Cu \rightarrow Cu^{++} + 2e^-$$

and, $$Sn \rightarrow Sn^{++} + 2e^-$$

The ground water normally found in a sump reservoir forms the electrolyte of the system. This ground water is not generally a pure water that is devoid of ions. Today the ground water is contaminated with various salts and acids which makes it slightly conductive by decreasing its resistance.

Typically, the voltage that is generated when the aluminum and brass electrodes just barely touch the water is about 0.576 volts DC, and when not immersed or touching the water, 0.0 volts. When this voltage change is applied to the input of an alarm module, it provides an extremely sensitive, reliable and repeatable system.

The alarm module has an input voltage threshold of about 0.1 volts and when this voltage threshold is exceeded, an audible alarm in sounded. A battery provides a voltage having a range from 7 volts to 11 volts furnishes the operating voltage for the alarm and its associated circuitry. This module is normally mounted to the wall well above the expected limit of the rising water.

The bracket that holds the dissimilar electrodes is comprised of a plastic bar, and two formed metal end brackets. The plastic bar is 11.5 inches long, 2 inches wide and ⅜ of an inch thick. A hole at each end allows attachment to the formed aluminum brackets. These formed support brackets are free to be positioned so that the entire assembly can be fitted into various sized sump reservoirs. Once positioned, they are each held in place by two nuts and bolts. These brackets can be rotated to fit any size hole, ranging from a 9 inch radius to an infinite radius.

Another advantage of this newly designed bracket assembly is the use of stepped end brackets that mount 2 inches below the top of the sump reservoir. By recessing the bracket, it allows the sump cover to be placed on top without causing an interference.

It is therefore an object of this invention to provide for a water level detection system that detects a DC voltage that is generated when two dissimilar metal electrodes come in contact with or are immersed in a fluid.

It is another object of this invention to provide for a water level detection system that provides reliable and repeatable performance when it detects a DC voltage that is generated when two dissimilar metal electrodes come in contact with or are immersed in a fluid.

It is still another object of this invention to provide for a water level detection system that provides increased sensitivity by detecting a DC voltage that is generated when two dissimilar metal electrodes come in contact with or immersed in the fluid.

It is yet another object of this invention to provide for a water level detection system that sounds an audible alarm when the water level exceeds a predetermined height.

It is still another object of this invention to provide for a water level detection system that has an audible alarm system that is battery operated to offer protection when a power failure occurs.

In addition, it is another object of this invention to provide for a water level detection system that is corrosion resistant because of the selection of materials and because the electrodes are not immersed in the liquid.

Also, it is still another object of this invention to provide for a water level detection system that has no moving parts that may be subjected to corrosion, such as floats and the like.

Additionally, it is still another object of this invention to provide for a water level detection system that has no additional moving parts that may be subjected to corrosion, such as switch contact closures that sound the alarm. The use of a solid-state alarm eliminates this problem.

One other object of this invention to provide for an adjustable and repositionable sump bracket that spans the sump reservoir. It can be installed in sump holes which range from a minimum 9 inch radius to and infinite radius.

Lastly, it is another object of this invention to provide for an adjustable and repositionable sump bracket that is recessed to allow the sump cover to be positioned over the sump hole without interference.

Further advantages will be apparent to those of ordinary skill in the art upon reading and understanding the following detailed description.

DETAILED DESCRIPTION OF THE PREFERRED EMBODIMENT

Figure 1:
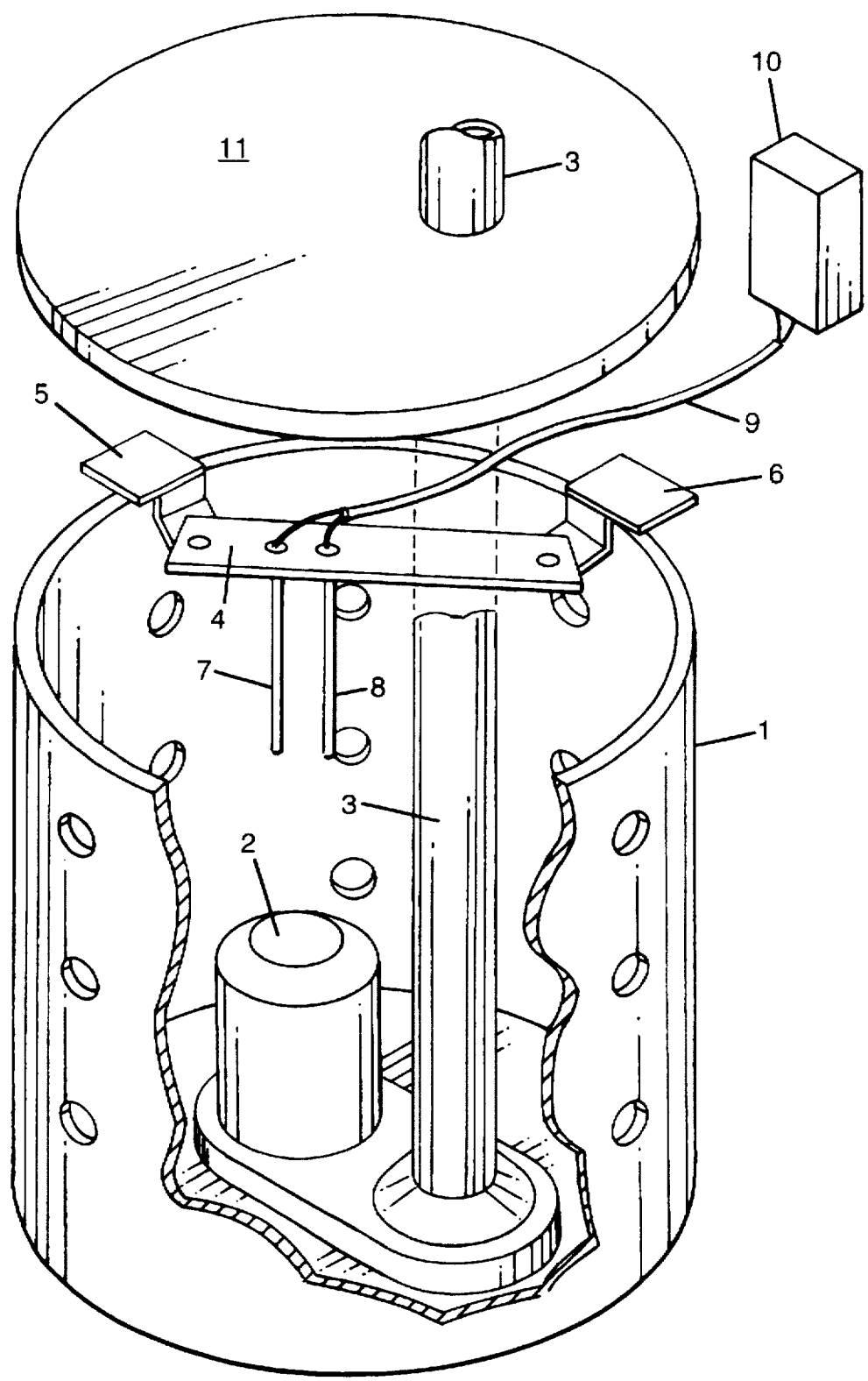
FIG. 1 is a detailed exploded view of the sump alarm system showing the dissimilar metal electrodes mounted to the universally positionable bracket.

With reference to the drawings, and in particular to FIG. 1, the preferred embodiment of the invention 100 is a newly designed sump alarm which utilizes a novel liquid level detection probe shown in its typical use in a sump environment.

The sump pump reservoir 1 is a liner for the sump hole that permits the submersible sump pump 2 to be placed in the bottom of the sump well. The sump pump 2 connects to discharge conduit 3 to direct the excess accumulation of water to an outside external drain.

The newly designed sump pump bracket is comprised of a plastic bridge 4. This plastic bridge measures 11.5×2.0× 0.375. Bolted to each end of the plastic bridge 4 are two repositionable recessed mounting brackets 5 and 6. These support brackets are made of aluminum and are dimensioned to recess the plastic bridge 2 inches. This support bracket assembly spans the opening of the sump and is adjustable for hole sizes ranging from 9 inches to infinity in radius.

Electrode 7 is comprised of a 6 inch long aluminum rod, 0.187 inches in diameter; electrode 8 is comprised of a 6 inch long brass rod, 0.187 inches in diameter. A pair of insulated conductors 9 connect the electrodes 7 and 8 to the wall mounted audible alarm 10. The sump cover 11 rests on top sump without interference from mounting support brackets 5 and 6.

Figure 2:
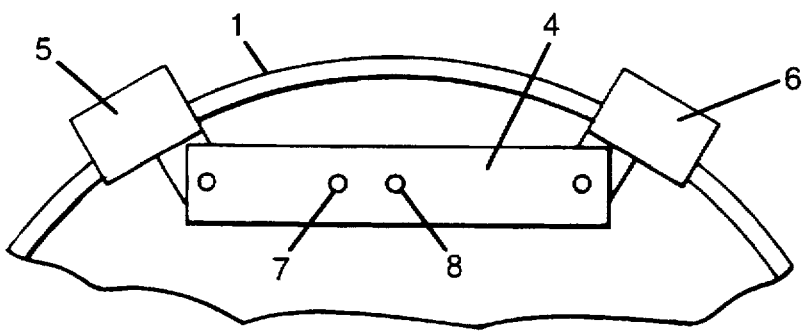
FIG. 2 is top sectional view of the universally positionable bracket as mounted in a sump hole.

Turning now to FIG. 2, where the top view of the mounting support bracket assembly is shown, the end brackets 5 and 6 are shown spanning the rim of the sump reservoir 1. Electrodes 7 and 8 are positioned in the insulated plastic bridge 4.

Figure 3:
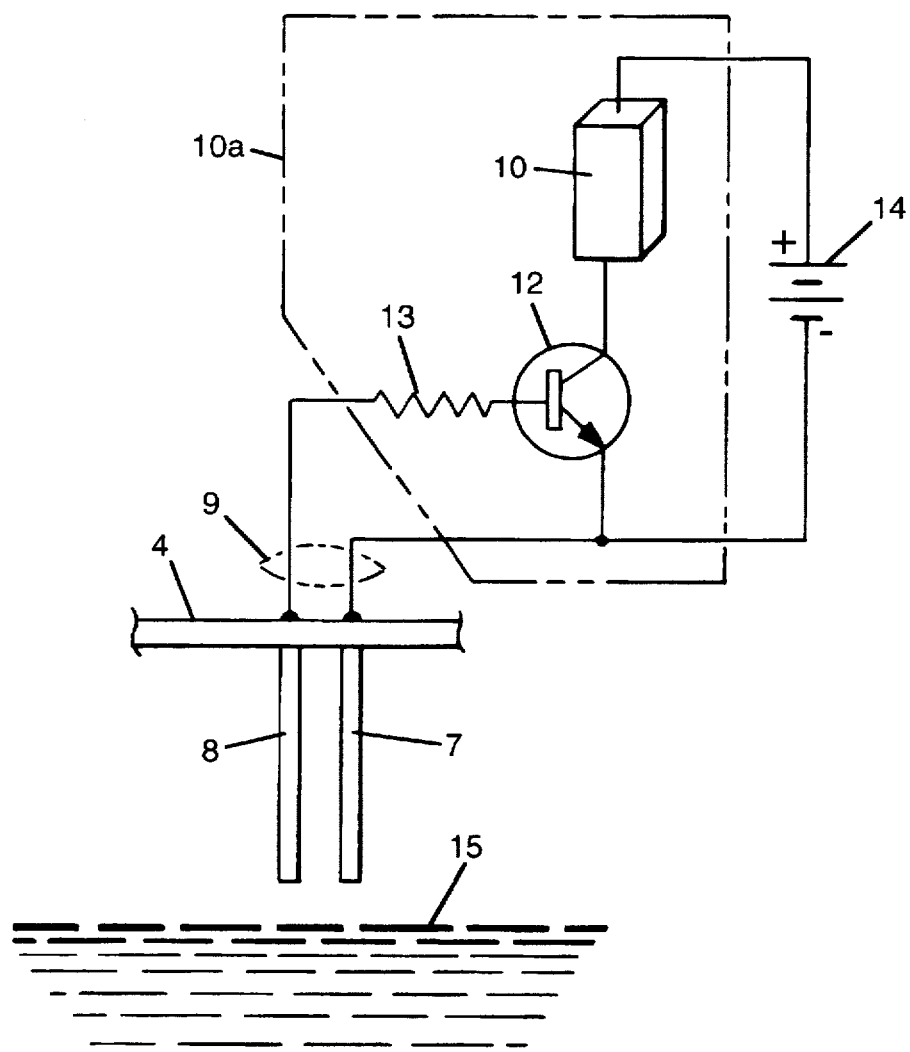
FIG. 3 is a schematic diagram showing the dissimilar metal electrodes connected to the alarm circuitry.

FIG. 3 is a schematic which shows the electrical connections from the dissimilar electrodes 7 and 8 to the alarm activation circuitry and subsequently, the alarm. The alarm module 10a is comprised of resistor 13, transistor 12 and an alarming device 10. Electrode 7 is made from an aluminum rod and connects to the emitter of NPN transistor 12. Brass electrode 8 connects to the base of NPN transistor 12 via protective resistor 13. The alarm device 10 connects to the collector of transistor 12 and to the positive terminal of battery 14. The negative terminal of battery 14 connects to the common connection of the emitter of NPN transistor 12 and aluminum electrode 7.

When the water 15 rises in level so as to touch and bridge the electrodes 7 and 8, a voltage of approximately 0.576 is generated. This generated voltage results in a minute current to flow into the base of transistor 12, causing the saturation of the emitter-collector junctions, thereby activating the audible alarm 10.

The details described are with reference to the preferred embodiment. Obviously, modifications of this invention can occur to others skilled in the art upon reading this specification. It is not the intent to limit the invention to the exact construction details shown, but to include any modifications or alterations that fall within the scope of the appended claims or their equivalents.

I claim:

1. A water level detection probe that includes a galvanic cell for sump pumps having a sump reservoir in a sump hole with a sump hole liner forming a sump well to accumulate excess water and for installation of a submersible sump pump in a bottom portion of the well, and a discharge conduit to direct an excess accumulation of water to an outside external drain, the detection probe comprising:

an alarm activation circuitry including a battery operated, solid state alarm device to operate the probe in the event of a prolonged power loss, the alarm having an input threshold;

the probe comprising first and second electrodes suspended in a fixed, essentially parallel position over the well, and extending an essentially equal length into the well; wherein said first electrode comprises an aluminum rod and the second electrode comprises a brass rod, and each electrode communicating on the circuit with the alarm device for generating a voltage of 0.576 volts DC, due to the ionic differential between the aluminum rod and brass rod electrodes, when excess water of the sump well simultaneously contacts both of the electrodes, whereby the probe provides a water level detection and alarm system for sump wells that remains in a fixed position over the well, that has no moving parts, and that does not impede reuse by requirement for relocation and resetting following a use thereof;

means for suspending the liquid level detection probe in a recessed position near a top of the sump well, for positioning a sump hole cover over the well without interference with the probe, whereby said probe enables well closure and prevents escape of fluids from the well without warning; and, means for adjusting the suspending means to fit any size sump hole.

2. A water level detection probe according to claim 1, wherein the sump reservoir contains a volume of ground water containing ions which form an ionic media and a galvanic cell when said ground water contacts both said dissimilar metal electrodes, with an automatic voltage output signal to the alarm, whereby said probe is advantageous for self-activating and de-activating operation without a requirement for manual monitoring for use thereof.

3. A water level detection probe according to claim 2, wherein said electrodes in contact with the ionic media generate a voltage of 0.576 volts DC concomitant with said simultaneous contact, without a necessity for complete immersion of said electrodes in the media.

4. A water level detection probe according to claim 3, wherein the power source comprises a wall mounted battery that is associated with the alarm and positioned above a highest expected water level, to provide a standby voltage for the alarm to offer protection when a power failure occurs, the battery having a range from 7 volts to 11 volts.

5. A liquid level detection probe according to claim 4, wherein the alarm device has an input voltage threshold and when the voltage threshold is exceeded, an audible alarm is sounded.

6. A liquid level detection probe according to claim 5, wherein the input voltage threshold of the alarm device equals 0.1 volts.

7. A water level detection probe according to claim 5, wherein the means for suspending the liquid level detection probe over the sump well comprises a support bracket assembly that spans the sump well and includes a plastic bridge having two ends, each of the ends connected to a repositionable recessed mounting bracket piece, for insulated positioning of said first and second electrodes in the bridge.

8. A water level detection probe galvanic cell according to claim 7, wherein the plastic bridge is formed as an elongate bar 11.5 inches long, 2 inches wide and ⅛ of an inch thick.

9. A water level detection probe according to claim 7, wherein the bridge further comprises a hole drilled therethrough at each bridge end.

10. A water level detection probe according to claim 9, wherein the means for adjusting the suspending means to fit any size sump hole comprises each said mounting bracket piece forming a stepped support bracket rotatably positioned at each end of the bridge and held in place by fastener bolts through said holes of the bridge ends.

11. A water level detection probe according to claim 10, wherein the system produces a zero volts when the ground water does not contact the electrodes; and the voltage generated when the level of the ground water rises to simultaneously contact the electrodes is 0.576 volts DC immediately upon said contact of the water with said electrodes, whereby the detection probe automatically returns to zero volts following an alarm and a removal of excess water from the well and is thereby advantageous for being repetitively operable without impeding reuse by any requirement of a voltmeter for resetting the probe at zero volts.

12. A water level detection probe according to claim 11, wherein each of the electrodes has a width, and the width of the first aluminum electrode is essentially equal to the width of the second brass electrode.

13. A water level detection probe according to claim 12, wherein said first electrode comprises a lengthwise dimension in a range from 5 to 7 inches and a diameter in a range from 0.150 to 0.200 inches and the second electrode comprises a lengthwise dimension in a range from 5 to 7 inches and a diameter ranging from 0.150 to 0.200 inches.

14. A water level detection probe according to claim 13, wherein each said mounting bracket piece is constructed of aluminum.

15. A water level detection probe according to claim 14, wherein each said mounting bracket piece is dimensioned to recess the bridge 2 inches into the sump well.

16. A water level detection probe according to claim 15, further comprising a pair of insulated conductors each of said conductor pair serving to connect the first aluminum rod and second brass rod electrodes to the alarm.

17. A water level detection probe according to claim 16, wherein the alarm device is mounted to a wall in an area remote from the sump reservoir and well above a highest anticipated water level of the ground water.

18. A water level detection probe according to claim 17, further comprising an alarm module having a protective resistor and a transistor in communication with the alarm device and the aluminum electrode.

19. A water level detection probe according to claim 18, wherein the transistor is a negative-positive-negative, NPN, transistor that includes an emitter, a base, and emitter-collector junctions, and the aluminum rod connects to the emitter.

20. A water level detection probe according to claim 19, wherein the power source is a battery having a positive and a negative terminal, and the brass rod connects to the positive terminal through the base of the NPN transistor via the resistor.

21. A water level detection probe according to claim 20, wherein the alarm device connects to the collector of the transistor and to the positive terminal of the battery, whereby when the water rises to contact and bridge the electrodes a voltage comprising 0.576 volts is generated to the base of the transistor that saturates the emitter-collector functions to activate the alarm.

22. A method for detecting that a volume of water within a reservoir has exceeded a predetermined water level, comprising the steps of:

providing a liquid level detection probe comprising a galvanic cell for sump pumps having a sump reservoir that contains a volume of ground water having a water level and further containing ions which form an ionic media; an alarm activation circuitry including an alarm device, an input threshold of 0.1 volts and a power source; the probe comprising a first aluminum rod electrode and a second brass rod electrode, each of the electrodes communicating on the circuit with the alarm device;

positioning the liquid level detection probe for sump pumps over a sump reservoir;

contacting the first aluminum rod and second brass rod electrodes in an ionic media when the sump reservoir volume of ground water rises above a predetermined level;

generating a voltage by a galvanic action of the aluminum rod and brass rod electrodes, when the electrodes contact an ionic media; and, activating the alarm device.

23. In a sump alarm system composed of two electrodes comprising an aluminum rod and a brass rod and an audible alarm circuitry connected thereto, the improvement comprising means for suspending the two electrodes in a sump reservoir, said means consisting essentially of an elongated non-conductive bar, a stepped support bracket rotationally attached to each end of the bar, and means to hold each of the brackets in place when the electrodes are positioned in a sump reservoir.

24. The system of claim 23, wherein the non-conductive bar is plastic, and the stepped support brackets are aluminum.

25. The system of claim 24, wherein each support bracket is secured to the bar by a nut and bolt.

26. In combination, a sump comprising a sump reservoir, a sump pump, an external sump drain, and a sump alarm for detecting a high water level in the sump reservoir, the sump alarm including a detector comprising a first aluminum electrode and a second brass electrode, each of the electrodes parallel, spaced from one another, and extending an essentially equal distance into the well; and, an adjustable suspending means for the electrodes comprising an insulated plastic bridge, and repositionable support brackets bolted to each end of the bridge.

27. The combination according to claim 26, further including an alarm comprising an alarm circuitry connected to the two electrodes for activating the alarm when rising water in the sump reservoir bridges the two electrodes.

28. The combination according to claim 27, wherein the support brackets are recessed and are made of aluminum.

29. The combination according to claim 28, wherein said first electrode is constructed of aluminum; and the second electrode is constructed of brass.

30. Improvements for a water level detection probe supported in a fixed position on a suspension means over a sump pump well of a type that contains a volume of ionized ground water which may exceed a capacity of the well, said water serving as an electrical circuit for the ends of said probe positioned at a predetermined height to be bridged by the water where it rises to exceed the well capacity, said improvements embodied by said probe, communicating on an alarm activation circuitry with an alarm device and a power source, comprising a first aluminum rod electrode and a second brass rod electrode the electrodes in parallel, and of essentially the same length, to form a galvanic cell for galvanic action at the aluminum electrode, and further, at the brass electrode, wherein said ground water normally found in a sump well forms an electrolyte of the galvanic cell for generating a voltage immediately upon contact of the aluminum and brass electrodes with the water of 0.576 volts DC, when the around water rises to a fixed position of the stationary electrodes, due to the ionic differential between the aluminum rod and brass rod electrodes, and 0.0 volts when the probe electrodes are not touching the water, wherein the suspension means comprises a support bracket assembly that spans the sump well and includes a plastic bridge having two ends, each of the ends connected to a rotatable recessed aluminum mounting bracket piece, for insulated positioning of said first and second electrodes in the bridge, and, wherein the alarm having an input voltage threshold of 0.1 volts, provides an alarm when the voltage threshold is exceeded by contact of said probe electrodes with the water.

* * * * *